United States Patent [19]

Moller et al.

[11] Patent Number: 4,889,698

[45] Date of Patent: Dec. 26, 1989

[54] PROCESS FOR REMOVAL OR MERCURY VAPOR AND/OR VAPOR OF NOXIOUS ORGANIC COMPOUNDS AND/OR NITROGEN OXIDES FROM FLUE GAS FROM AN INCINERATOR PLANT

[75] Inventors: Jens T. Moller, Allerod; Niels Jacobsen, Copenhagen; Kirsten K. Nielsen, Holte; Stig Rasmussen, Gadstrup, all of Denmark

[73] Assignee: A/S Niro Atomizer, Soborg, Denmark

[21] Appl. No.: 71,191

[22] Filed: Jul. 8, 1987

[30] Foreign Application Priority Data

Jul. 16, 1986 [DK] Denmark .............................. 3381/86

[51] Int. Cl.[4] .............................................. B01D 53/34
[52] U.S. Cl. ......................................... 423/210; 55/72; 423/235; 423/239; 423/245.1; 423/245.2
[58] Field of Search ............... 423/235, 239, 210, 245, 423/245.1, 245.2; 55/72

[56] References Cited

U.S. PATENT DOCUMENTS

| | | | |
|---|---|---|---|
| 4,061,476 | 12/1977 | Holter et al. | 423/210 |
| 4,246,242 | 1/1981 | Butler et al. | 423/210 |
| 4,273,747 | 6/1981 | Rasmussen | 55/72 |

FOREIGN PATENT DOCUMENTS

| | | | |
|---|---|---|---|
| 208490 | 1/1987 | European Pat. Off. | 423/245 |
| 2139678 | 6/1974 | Fed. Rep. of Germany | |
| 3015977 | 11/1981 | Fed. Rep. of Germany | |
| 3235020 | 3/1984 | Fed. Rep. of Germany | |
| 3426059 | 1/1986 | Fed. Rep. of Germany | |
| 38275 | 10/1978 | Japan | 55/72 |
| 125716 | 10/1972 | Norway | |

OTHER PUBLICATIONS

Kohl & Riesenfeld, Gas Purification, 3rd ed. Gulf Publishing Co. 1979, pp. 627–631.
Chemistry, Bailar, Jr. et al. Academic Press 1978, pp. 419–420.

*Primary Examiner*—John Doll
*Assistant Examiner*—Jeffrey Edwin Russel
*Attorney, Agent, or Firm*—Banner, Birch, McKie & Beckett

[57] ABSTRACT

The ability of activated carbon to remove mercury and noxious polyorganic matter, especially chlorodibenzo-dioxins and -furans from incinerator flue gases is utilized in an efficient manner by suspending powdery activated carbon in the flue gas in connection with a conventional spray absorption process in which the acidic components of the flue gas are neutralized by means of basic absorbents. The cooling of the flue gases in the spray absorption process provides an efficient adsorption onto the powdery activated carbon and the separation of said powdery activated carbon from the flue gas is substantially facilitated by the presence of the particulate material formed by the spray absorption process. Also an improved removal of nitrogen oxides is obtained.

10 Claims, 2 Drawing Sheets

PROCESS FOR REMOVAL OR MERCURY VAPOR AND/OR VAPOR OF NOXIOUS ORGANIC COMPOUNDS AND/OR NITROGEN OXIDES FROM FLUE GAS FROM AN INCINERATOR PLANT

FIELD OF THE INVENTION

Within the last decade it has been realized that with the rapid increase in the number and in the capacity of incinerator plants for incinerting domestic refuse in the industrialized world, cleaning of flue gas from said plants should not be restricted to removal of the main pollutants therein, such as HCl, $SO_2$ and $NO_X$. Also components occurring in substantially minor amounts may represent a risk to the environment due to their extreme toxicity.

Among said minor pollutants which hitherto have caused the most pronounced concern are mercury and various noxious organic compounds including polyaromatic hydrocarbons (PAH) and polychlorinated compounds, e.g. polychlorinated biphenyls (PCB), and especially chlorodibenzo-dioxins and -furans are regarded as presenting a risk to human and animal life even in very small concentrations. All these organic compounds are often referred to as noxious POM (polyorganic matter) which abbreviation will be used throughout the present specification.

In several countries legislation is being prepared with a view to reducing mercury emission.

In flue gas from incineration of domestic refuse the amount of mercury vapor (which in this context means vapor of elementary mercury as well as mercury-containing chemical compounds in vapor phase) may vary within wide limits. Typical concentrations will be in the range of 100–1000 $\mu g/N\ m^3$.

The above mentioned chlorodibenzo-dioxins and -furans are represented by the formulae and resp., wherein n and m each independently is an integer from 0 through 4 provided that n+m is at least 2.

Some of the dioxins and furans of the above formulae exhibit an extremely high toxicity towards animal life. The concentration of these compounds in incinerator flue gases varies considerably, dependent primarily on the temperature prevailing in the combustion zone of the incinerator and on the composition of the refuse which is incinerated. Typically the concentration is 0.1–1.0 $\mu g/N\ m^3$ but substantial variations also outside this range are usual.

Incinerator flue gases also contain considerable amounts of nitrogen oxides which are not always removed efficiently by the conventional flue gas purification steps using basic absorbants.

DESCRIPTION OF PRIOR ART

Numerous methods have been suggested for removing or recovering mercury from gases. However, the majority of the prior art processes have been created with the purpose of removing mercury from relatively small amounts of gas having high mercury concentration. These processes are not suitable for cleaning flue gas since costs of chemicals would be prohibitive or operation would be impracticable in connection with large volumes of flue gas.

Processes for removing mercury from air of relatively low mercury content have also been suggested. Such a process is disclosed in published European patent application No. 1,456 (Akzo N.V.). Said process which is described as particularly suitable for the removal of mercury from air which is vented from buildings, is based on the principle that mercury vapor is absorbed as mercury chloride when passing a bed of activated carbon having a specific chlorine content. According to the specification of said European application high moisture content of the gas from which mercury is to be removed should be avoided since the effectiveness of the activated carbon is reduced thereby. From said specification it also appears that activated carbon used in a stationary bed without chlorine is unsatisfactory as absorbent for mercury and has a very low capacity for that purpose.

The process of said European application seems unsuitable for treating flue gas since it would require the total amount of flue gas to be passed through a bed of activated carbon to which gaseous chlorie is added, which obviously involves the risk that any excessive amount of chlorine may be entrained with flue gas to the atmosphere.

A process for removing mercury vapor from a hot hydrogen chloride-containing flue gas is disclosed in published European patent application No. 13,567, (Svenska Fläktfabriken). According to said process the gas which contains hydrogen chloride and minor amounts of mercury vapor is contacted with powdered calcium hydroxide, preferably in a fluidized bed. The hydrogen chloride in the gas reacts with the calcium hydroxide to form calcium chloride which apparently is essential to the removal of mercury. However, said process does not always enable reduction of mercury vapor to the required low levels, and it is without any substantial effect as to removal of the noxious organic material.

U.S. Pat. No. 4,273,747 (Rasmussen) discloses removal of mercury from hot waste gases by atomizing an aqueous liquid into the waste gases in the presence of fly ash suspended in the gas and subsequently separating the fly ash together with a substantial part of the mercury originally present as vapor. It is essential that by said treatment the gas stream is cooled from a temperature of at least 200° C. to a temperature below 160° C. The aqueous liquid may be just water or it may be an aqueous solution or suspension of an alkaline compound, preferably calcium hydroxide.

Obviously said method will not be suitable in case it is not acceptable to cool the gas to the extent required or if the amount of fly ash is insufficient due to the use of a preceding fly ash separation. Even when the conditions as to fly ash content of the flue gas and cooling are satisfied it would in certain applications be desired to increase the efficiency of the removal of mercury vapor in said process. Said U.S. specification does not disclose any effect of the process as far as removal of chlorodibenzo-dioxins and -furans is concerned.

Efforts to reduce POM, especially the chlorodibenzo-dioxin and -furan levels in flue gas have hitherto mainly concentrated on thermal destruction.

According to a paper of A. J. Teller and J. D. Lauber: "Control of Dioxin Emissions from Incineration" presented at the 76th annual meeting of the Air Pollution Control Association, Atlanta, Ga. Jun. 19–24, 1983, theoretical estimations indicate that emission may be reduced by condensing the dioxin thereof. However, Karl J. Thomé-Kozmiensky: "Müllverbrennung und Umwelt", EF-Verlag für Energie- und Umwelttechnik GmbH, Berlin (1985) states results showing that wet scrubbing of flue gasses has a very small effect on the emission concentration of polychlorinated dibenzo-dioxins and -furans.

In German Offenlegungsschrift 34 26 059 a process is described in which organic polyhalogenated pollutants are removed from flue gases by adsorbing the pollutants on a fixed bed of an adsorbent such as activated coke or carbon followed by a heating of the adsorbent and destruction of the pollutants at elevated temperatures. Such a process which involves passage of the gas through adsorbent beds of several metres height is obviously not suitable for treating flue gas from large incinerator plants, and since it is based on thermal destruction of the pollutants it is completely unable to cope with mercury containing flue gases.

Also in the specification to PCT application WO 85/03455 active charcoal or coke is used to remove noxious flue gas components including heavy metals. Also in said specification the active coal or coke is used in a fixed bed which means that it should be in the form of rather coarse non-dusting particles or granulates which are expensive to produce and are less active than a corresponding powdery adsorbent.

U.S. Pat. No. 4,061,476 discloses a gas purification method in which a pulverulent solid sorption agent is injected into a stream of noxious-contaminant-containing gas subjected to intensive turbulence and subsequently separated from the gas. Among other sorption agents powdery filtering charcoal is suggested without indication of the contaminations for which this specific sorption agent is intended. According to said specification the absorbents are advantageously of grain sizes of less than 100 $\mu$, preferably less than 50$\mu$. However, it has turned out that when the sorption agent is activated carbon in the form of fine particles efficient separation of the carbon from the gas stream cause troubles. This applies both when electrostatic precipitators and fabric filters are used for the separation.

Consequently a need exists for an improved method for removing mercury vapor and/or noxious organic compounds from flue gases.

Also for the removal of nitrogen oxides numerous methods have been proposed. However, due to the complexity of most of these methods there is still a need for a simple and reliable process for removing also nitrogen oxides from incinerator flue gases.

SUMMARY OF THE INVENTION

In copending Danish patent application No. 2984/85 filed Jul. 1, 1985 a process is described in which mercury vapor and vapor of chlorodibenzo-dioxins and -furans are removed from a stream of hot flue gas together with acidic components of the flue gas in a spray absorption process. The absorbent used in said process is an aqueous liquid which besides alkaline components contains suspended activated carbon.

It has turned out that adsorption of mercury vapor and vapors of noxious organic compounds, especially chlorodibenzo-dioxins and -furans, as well as removal of nitrogen oxides by means of activated carbon may be performed with a surprisingly high efficiency using the process according to the invention by which one or more of these polutants are removed from a stream of hot flue gas exhausted from an incinerator plant and possibly containing fly ash, combined with a simultaneous removal of acidic components of the flue gas, by passing said stream at a temperature of 135°–400° C. into a spray absorption chamber wherein an aqueous liquid containing a basic absorbent is atomized to cool the flue gas at a temperature between 180° C. and 90° C. and to absorb acidic components from the flue gas, and simultaneously to evaporate the water in said aqueous liquid, thereby forming a particulate material containing reaction products of the basic absorbent with acidic components of the flue gas, and non-reacted absorbent, which particulate material together with the fly ash, if any, is separated from the flue gas in a particle separator downstream of the spray absorption chamber, comprising injecting powdery activated carbon in an amount of 1–800 mg per Nm$^3$ flue gas into the stream of flue gas at least one location selected from locations upstream of the spray absorption chamber, locations within the spray absorption chamber and locations downstream the spray absorption chamber but upstream of the particle separator, and separating said powdery carbon onto which mercury and/or noxious organic compounds have been adsorbed in the particle separator together with said particulate material.

By this method it is possible to obtain a very efficient removal of the pollutants in question, and at the same time to keep the consumption of activated carbon at a very moderate level.

In contrast to prior art flue gas purification processes which utilize coarse or granulated activated carbon in a fixed bed the present process uses the activated carbon as a fine powder which is suspended in the gas stream and subsequently removed therefrom together with the particulate material formed by the spray absorption process.

The use of pulverized activated carbon involves certain advantages over the use of a coarse or granulated carbon due to the relatively higher adsorption capacity of the powdery material and the lower price thereof.

However, the use of powdery carbon for purification of flue gas has hitherto not been regarded as suitable, at least not in connection with industrial scale processes because separation of fine particles of activated carbon from a gas stream involves certain problems.

Fine carbon particles are not easily removed by means of a mechanical filter such as a baghouse, since the fine carbon particles tend to block the filter and thereby create an unacceptably high pressure drop over the filter.

It is also well recognized that electrostatic precipitators are less efficient than desired to remove fine particles of activated carbon occuring as also particulate material in a gas stream. This is due to the fact that the carbon particles have a too low electric resistivity (or a too high conductivity) which means that they loose their electric charge when contacting the ground eletrode of the electrostatic precipitator. Thereby the carbon particles are not efficiently retained but tend to become resuspended in the gas stream. This results in an unsatisfactory particle separation from the gas stream unless the consumption of electric energy is increased substantially.

However, it has turned out that the presence of the particulate material formed by the spray absorption facilitates the recovery of the powdery activated carbon from the gas stream, not only when a baghouse is used as particle separator but also when particle separation is performed by means of an electrostatic precipitator.

When particle separation is performed by means of a mechanical filter such as a baghouse the particulate material formed in the spray absorption process together with any fly ash present and the flue gas acts as filter aid thereby permitting building up of a powder layer having a substantial thickness on the filter surfaces without undue increase of the resistance to gas passage and consequently without a large pressure drop over the filter. The fine particles of activated carbon are embedded in the powder layer thus deposited on the filter surface and dust problems due to penetration of the carbon particles through the filter are avoided and increase of pressure drop over the filter is substantially delayed.

In case particle separation is made by means of an electrostatic precipitator the particulate material formed in the spray absorption process also has the effect of facilitating the removal of the carbon particles because said particulate material by covering the electrode forms a layer into which the small carbon particles are bound and which layer impedes direct contact between the particles and the electrodes whereby undue discharge of the carbon particles is avoided. Thereby resuspension of the carbon particles in the stream of gas is less likely to take place and the carbon particles are recovered from the electrostatic precipitator in admixture with said particulate material and any fly ash originally present in the flue gas.

Thus the special combination of features prescribed in the process according to the invention enables use of powdery activated carbon for removal of mercury, noxious organic compounds and nitrogen oxides thereby obtaining a very efficient utilization of the high adsorption ability of powdery activated carbon by a modification of the conventional spray drying process which modification only involves moderate increase in investment and operation costs.

In the present specification and in the attached claims the term "powdery activated carbon" is used in a somewhat broader sense than said term is usually applied in commerce. In the present specification said term is not limited to cover materials which have been subjected to an "activation" treatment, e.g. with vapor. The term is intended to cover also powdery carbonacious materials such as coal, coke or the like which have an adsorption activity which is not the result of a special activation but which is inherent in the powdery material already when formed, e.g. by grinding or by thermal decomposition.

Thus the absorption material used in the present process may be substantially cheaper than commercial "activated carbon" which has usually been subjected to special activation and purification procedures.

The term "powdery" is used to distinguish the carbonacious material used in this process from the granulated activated carbons conventionally used as fixed bed adsorbents for gas purification.

Very satisfactory results have been obtained using activated carbons produced from bituminous coal having a particle size corresponding to 60–85% passing a sieve with 44 micron apertures. Microscopic examination of said powdery carbon reveals an average particle size of only a few microns or less.

The very high adsorption efficiency of the activated carbon in the process according to the invention is a result of the improved adsorption conditions provided by the cooling of the gas stream which takes place in the spray absorption process performed immediately after, during or immediately before the introduction of the powdery activated carbon into the gas stream.

When the powdery activated carbon is injected into the flue gas stream at a location downstream of the spray absorption chamber it is preferred to use a baghouse as particle separator because an intimate contact between flue gas and carbon is obtained when the flue gas passes through the carbon containing layer of particulate reaction products which builds up on the filter surfaces.

However certain incinerator plants produce a flue gas which entrains burning particles that may damage the filter fabric of the baghouse. This is one of the reasons why it has been conventionel to use electrostatic precipitators in preference to baghouse filters for removal of particulate material from incinerator flue gases.

The present process is also suitable for being performed using a plant in which particles are separated by means of an electrostatic precipitator. Since contact between flue gas and collected particulate material is less intimate in an electrostatic precipitator than in a baghouse filter it is preferred to inject the powdery activated carbon into the gas stream at a location at some distance from the electrostatic precipitator, e.g. in the spray absorption chamber or upstream of said chamber.

The basic absorbent atomized in an aqueous suspension or solution into the spray absorption chamber is preferably calcium hydroxide (hydrated lime, slaked lime), sodium carbonate or hydrogen carbonate or pulverized limestone.

As disclosed in the above cited U.S. patent specification No. 4,273,747 fly ash from incinerator plants has a certain ability to remove mercury vapor from flue gas when present in the hot flue gas during the cooling thereof by atomizing aqueous liquids into the hot flue gas.

Therefore it is preferred to leave any fly ash present in the flue gas to be cleaned and only separate it from the gas together with the particulate material comprising reaction products of the basic absorbent with acidic components of the flue gas, non-reacted basic absorbent and activated carbon.

However, the process according to the invention may also be succesfully performed on flue gas from which the fly ash has been removed in a preceding particle separation step.

The high activity of the powdery activated carbon when injected before the spray absorption process is reflected by the fact that use of 5–100 mg activated carbon per N $m^3$ flue gas will usually be sufficient to reduce the content of mercury and chlorodibenzodioxins and -furans by 90% or more, when said pollutants occur in the concentrations usual in incinerator flue gases.

The tests hitherto performed indicate that a very efficient removal of the pollutants in question is obtained when injection of activated carbon in the above specified amounts is made in connection with a spray absorption process in which sufficient water is evaporated to cool the flue gas to 110°–130° C.

It has turned out that the present process also results in a substantial decrease of the content of nitrogen oxides in the flue gas. This is probably due to the catalytic effect of the activated carbon which promotes the oxidation of NO into $NO_2$ which is absorbed by the basic absorbent present in the spray absorption chamber and in the particle separator, possibly combined with an adsorption of the nitrogen oxides by the carbon powder.

Since nitrogen oxides are usually present in incinerator flue gases in amounts several orders of magnitude higher than the amounts of mercury and POM, it is preferred to use relatively large quantities of carbon, e.g. 100–500 mg/N $m^3$, when an efficient removal of nitrogen oxides is aimed at.

BRIEF DESCRIPTION OF THE DRAWING

The process according to the invention will be further described with reference to the drawing wherein.

Figure 1:
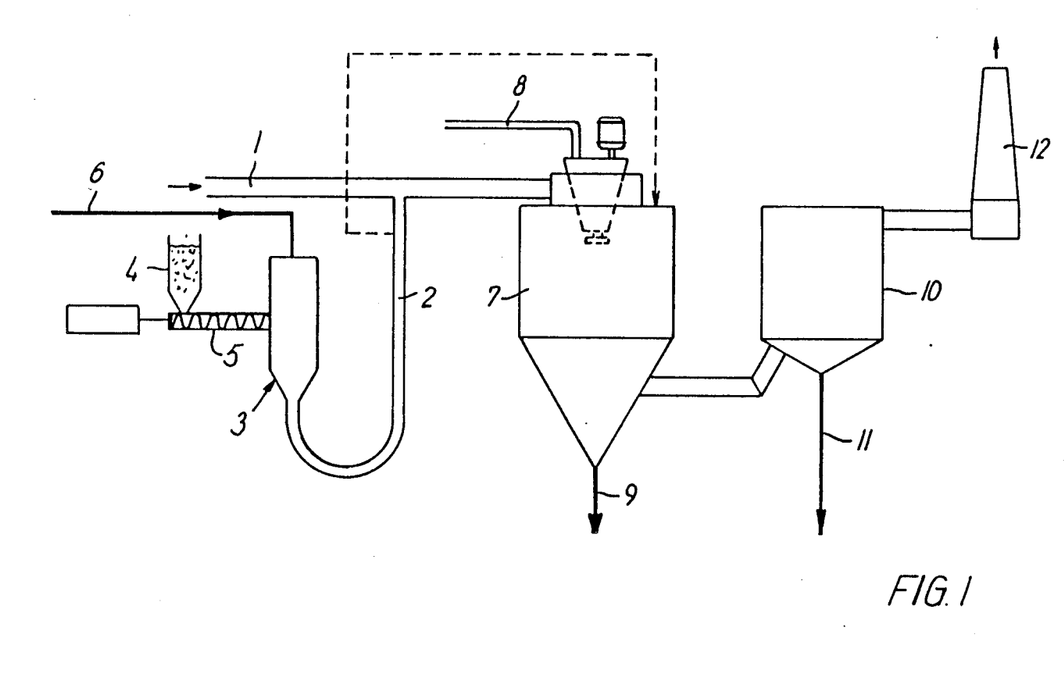
FIG. 1 is a flow diagram illustrating an embodiment of the process according to the invention.

In FIG. 1 is depicted a duct 1 which carries a stream of hot incinerator waste gas which besides acidic components such as HCl, $SO_2$ and nitrogen oxides contains mercury vapor and noxious organic matter, especially chlorodibenzodioxins and -furans. The waste gas also contains fly ash.

In said duct 1 debouches a pipe 2 connected to a pneumatic system 3 for providing a constant amount of powdery activated carbon to the flue gas. The system 3 comprises a hopper 4 for powdery activated carbon and a screw feeder 5 adjusted to deliver a constant rate of carbon or controlled to provide carbon in dependency on the amount and composition of the flue gas stream in duct 1. The system 3 is provided with pressurized air through conduit 6.

The carbon may, of course, be injected by any other means suitable for dispersing into the flue gas.

The carbon powder is entrained by the waste gas in duct 1 and carried to a spray absorption chamber 7. In said chamber an aqueous absorbent such as a suspension of lime or limestone or a solution of sodium carbonate or sodium hydrogen carbonate, provided through duct 8, is atomized to small droplets. By contact with the hot waste gases in the chamber the water evaporates from the atomized droplets whereby the temperature of the gas decreases substantially and at the same time acidic substances in the waste gas react with the basic absorbent producing a particulate material primarily comprising salts formed by said reaction, together with non-reacted absorbent.

It has not been investigated to which extent the fine particles of activated carbon present in the gas contacts the droplets atomized in the spray absorption chamber in this embodiment.

Alternatively the pipe 2 may debouch in the very spray absorption chamber 7 (as indicated by the dotted lines).

A particulate material comprising said reaction products, non-reacted absorbent, possible fly ash and activated carbon may be recovered from the bottom of the spray absorption chamber through 9 whereas the remaining part of said reaction products and non-reacted absorbent and nearly all the activated carbon and fly ash remain suspended in the gas until the gas reaches an electrostatic precipitator 10, in which substantially all particulate material is separated and removed through 11.

From the electrostatic precipitator the gas from which a substantial part of mercury vapor and noxious organic matter, especially chlorodibenzo-dioxins and -furans, originally present therein, have been absorped, may be discharged to the atmosphere via a stack 12.

In the embodiment illustrated in FIG. 2 reference numerals identical to those used in FIG. 1 have the same significance as explained in connection with FIG. 1.

As it appears the system 3 for providing powdery activated carbon injects the carbon at a location downstream of the spray absorption chamber 7. In this embodiment the particle collector is a baghouse 13 from where the powdery carbon mixed with particulate material formed in the spray absorption chamber 7 and mixed with any fly ash originally present in the flue gas in duct 1, is recovered through conduit 14.

The process according to the invention is further elucidated by the following examples.

EXAMPLE 1

Figure 2:
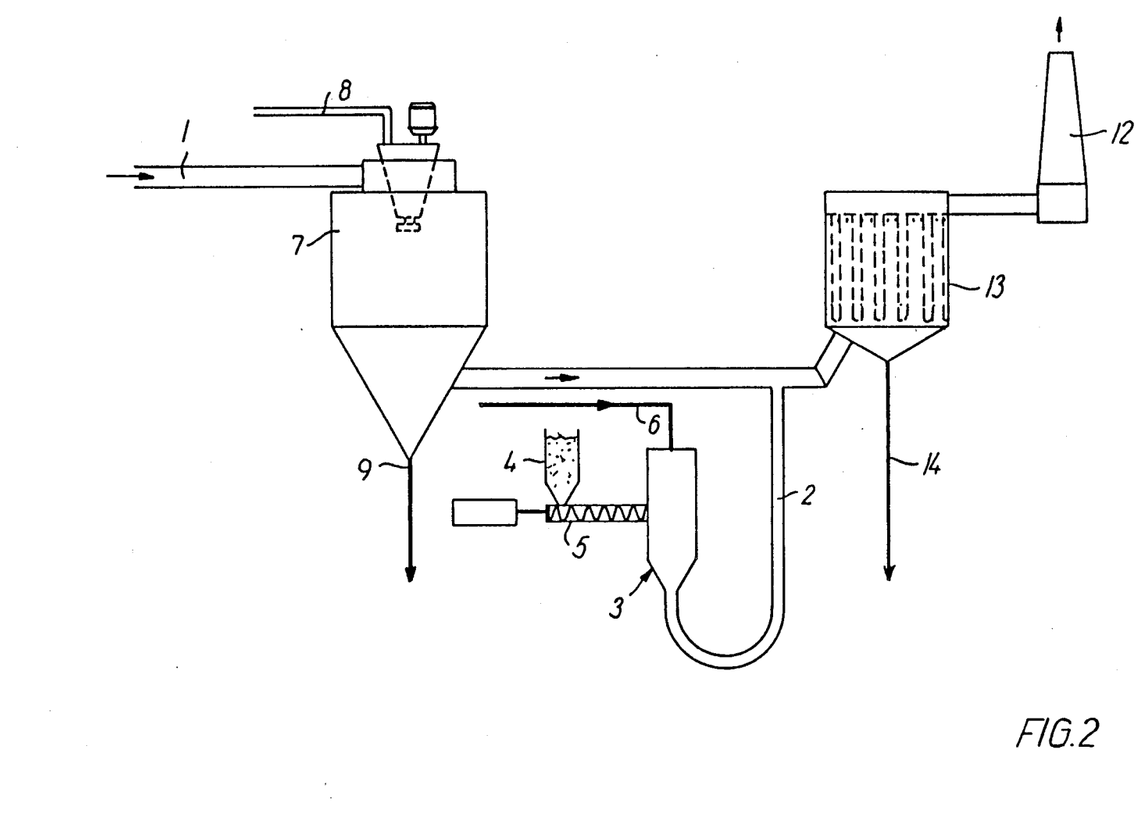
FIG. 2 is a flow diagram illustrating another embodiment of the process according to the invention.

This example was performed in a pilot plant of the type depicted in FIG. 2 treating 300 N $m^3$/h flue gas.

During the tests the temperature of the flue gas supplied through duct 1 varied from 230° C. to 300° C.

An aqueous suspension of slaked lime was atomized in the spray absorption chamber 7 to obtain a total removal of 80–95% of acidic components (HCl and $SO_2$) in the process. The baghouse 13 was of the pulse jet type.

Powdery activated carbon was injected between the spray drying absorption chamber and the pulse jet filter in amounts as indicated in table 1 below.

The powdery activated carbon was of a quality which has a total surface area (determined by the BET method) of 1000–1100 $m^2$/g, a pore volume of 0.8–0.95 $cm^3$/g and a mesh size corresponding to a screen analysis (passing 44 micron apertures) of 65–85%. Microscopic examination indicates that most particles have a diameter of 1 micron or less. The material is produced by pulverizing bituminous coal and is activated by steam treatment.

Also comparison tests without addition of activated carbon were carried out.

Further parameters of the tests as well as the results obtained appear from the following table 1:

TABLE 1

| | Test 1 | Test 2 | Test 3 | Test 4 |
|---|---|---|---|---|
| Gas temperature after spray absorption chamber (7) | 140° C. | 110° C. | 110° C. | 130° C. |
| Activated carbon injected mg/$Nm^3$ | 80 | 80 | 80 | 0 |
| Hg in gas in duct (1) | 413 μg/$Nm^3$ | 122 μg/$Nm^3$ | 350 μg/$Nm^3$ | 287 μg/$Nm^3$ |
| Hg in gas | 38 μg/$Nm^3$ | 13 μg/$Nm^3$ | 18 μg/$Nm^3$ | 89 μg/$Nm^3$ |

TABLE 1-continued

|  | Test 1 | Test 2 | Test 3 | Test 4 |
|---|---|---|---|---|
| downstream of baghouse (13) |  |  |  |  |
| Removal of Hg | 91% | 89% | 95% | 69% |

The incinerator gas stream used in all four tests had a fly ash content of approximately 2 g/Nm$^3$.

The above results clearly indicate that the use of even minor amounts of activated carbon causes a highly significant reduction of the concentration of mercury vapor in the flue gas.

EXAMPLE 2

Also the tests in this example were carried out to illustrate the ability of the present process to reduce mercury vapor content in flue gas.

The tests were made on an industrial plant receiving 100,000 Nm$^3$/hour incinerator flue gas having an approximate temperature of 240°–260° C. and a fly ash content of approximately 2.5 g/Nm$^3$.

The plant concept corresponded to the one illustrated in FIG. 1.

The parameters and results of the tests appear from the following table 2.

TABLE 2

|  | Test 5 | Test 6 | Test 7 | Test 8 | Test 9 | Test 10 |
|---|---|---|---|---|---|---|
| Gas temperature after spray absorption chamber (7) | 110° C. | 110° C. | 110° C. | 110° C. | 140° C. | 140° C. |
| Activated carbon injected mg/Nm$^3$ | 50 | 55 | 30 | 0 | 60 | 0 |
| Hg in gas in duct (1) µg/Nm$^3$ | 650 | 417 | 486 | 411 | 395 | 537 |
| Hg in gas downstream electrostatic precipitator (10) µg/Nm$^3$ | 45 | 40 | 68 | 141 | 85 | 390 |
| Removal of Hg | 93% | 90% | 86% | 66% | 78% | 27% |

This example illustrates that also when particle separation takes place by means of an electrostatic precipitator it is possible to achieve an efficient removal of mercury by the present process.

EXAMPLE 3

In this example the ability is demonstrated for the process according to the invention to reduce drastically the amount of noxious organic matter, especially dichlorobenzo-dioxins and -furans in incinerator flue gas.

The tests made in this example were carried out on a pilot plant as the one shown in FIG. 2.

Incinerator flue gas was applied through duct 1 in an amount of 300 Nm$^3$/h. The fly ash content of said flue gas was 2 g/Nm$^3$ and the temperature varied between 230°–300° C.

The baghouse 13 was of the pulse jet type.

Further parameters of the tests and the results obtained thereby appears from the following table 3 in which the values stated for POM represent the amount of chlorinated dibenzo-dioxins plus the amount of chlorinated dibenzo-furans.

TABLE 3

|  | Test 11 | Test 12 | Test 13 |
|---|---|---|---|
| Temp. after spray absorption chamber (7) | 110° C. | 110° C. | 140° C. |
| Avtivated carbon injected, mg/Nm$^3$ | 50–67 | 0 | 50–67 |
| POM in gas in duct (1) | 0.77 µg/Nm$^3$ | 0.43 µg/Nm$^3$ | 0.38 µg/Nm$^3$ |
| POM in gas after baghouse (13) | <0.01 µg/Nm$^3$ | 0.1 µg/Nm$^3$ | 0.01 µg/Nm$^3$ |
| Removal of POM | <99% | 77% | 97% |

From table 3 it appears that an extremely efficient removal of chlorodibenzo-dioxins and chlorodibenzo-furans is obtained by the process according to the invention.

Although only the decrease of chlorodibenzo-dioxins and chlorodibenzo-furans has been analyzed it is possible on the basis of the above results combined with generel knowledge as to the absorption characteristics of other noxious polyorganic substances to conclude that the process according to the invention will have generel applicability for reducing noxious POM in incinerator flue gases.

EXAMPLE 4

The tests performed in this example were made using an industrial plant of the type depicted in FIG. 1 in which a stream of incinerator flue gas of 50–70,000 Nm$^3$/h was treated.

Also in this example the tests were performed with the aim of demonstrating the adsorption of POM.

The temperature of the flue gas before treatment was 240°–280° C.

The results appear from the following table 4.

TABLE 4

|  | Test 14 | Test 15 | Test 16 |
|---|---|---|---|
| Temp. after absorption chamber (7) | 110° C. | 110° C. | 140° C. |
| Activated carbon injected, mg/Nm$^3$ | 40–50 | 0 | 40–50 |
| POM in gas in duct (1) µg/Nm$^3$ | 0.46 | 0.42 | 0.37 |
| POM in gas after electrostatic precipitator (10) | 0.03 | 0.2 | 0.06 |
| Removal of POM | 93% | 48% | 84% |

The results of table 4 demonstrates that also in an industrial plant based on the principal shown in FIG. 1 using an electrostatic precipitator it is possible to obtain a substantial reduction of the amount of noxious organic material by the process according to the invention.

EXAMPLE 5

This example demonstrates the ability of the present process for reducing the amount of nitrogen oxides in the flue gas from incinerator plants.

The tests were carried out using an industrial plant as the one illustrated in FIG. 1.

The incinerator flue gas was supplied in an amount of approximately 60,000–100,000 $Nm^3/h$ at a temperature of approx. 240°–280° C.

Process parameters and the results obtained appear from the following table 5 in which the concentration of nitrogen oxides is calculated as $NO_2$.

TABLE 5

|  | Test 17 | Test 18 | Test 19 |
|---|---|---|---|
| Temp. after spray-absorption chamber | 110° C. | 130° C. | 155° C. |
| Activated carbon injected, $mg/Nm^3$ | 50 | 0 | 250 |
| $NO_x$ in gas in duct (1), $mg/Nm^3$ | 560 | 237 | 225 |
| $NO_x$ in gas from electrostatic precipitator (10), $mg/Nm^3$ | 330 | 221 | 105 |
| Removal of $NO_x$ | 41% | 7% | 53% |

It is believed that the increased removal of $NO_x$ observed when activated carbon is present is due to the fact that a part of the NO in the gas is oxidized into $NO_2$ as a result of the catalytic effect of the activated carbon possibly combined with an adsorption of the nitrogen oxides by the carbon powder. The $NO_2$ thus formed reacts with the basic absorbent and is thereby removed from the gas.

We claim:

1. A process for removal of mercury vapor and/or vapor of noxious organic compounds and/or nitrogen oxides from a stream of hot flue gas exhausted from an incinerator plant and possibly containing fly ash, combined with a simultaneous removal of acidic components of the flue gas, by passing said stream at a temperature of 135°–400° C. into a spray absorption chamber wherein an aqueous liquid containing a basic absorbent is atomized to cool the flue gas at a temperature between 180° C. and 90° C. and to absorb acidic components from the flue gas, and simultaneously to evaporate the water in said aqueous liquid, thereby forming a particulate material containing reaction products of the basic absorbent with acidic components of the flue gas, and nonreacted absorbent, which particulate material together with the fly ash, if any, is separated from the flue gas in a particle separator downstream of the spray absorption chamber, comprising injecting powdery activated carbon in an amount of 1–800 mg per $Nm^3$ flue gas into the stream of flue gas at least one location selected from locations upstream of the spray absorption chamber, locations within the spray absorption chamber and locations downstream the spray absorption chamber but upstream of the particle separator, and separating said powdery carbon in the particle separator together with said particulate material.

2. A process according to claim 1 wherein the powdery carbon is injected into the flue gas stream at a location downstream of the spray absorption chamber.

3. A process according to claim 1 or 2 wherein said particulate material and the powdery carbon as well as any fly ash are separated from the flue gas by means of a bag filter.

4. A process according to claim 1 wherein the powdery carbon is injected into the flue gas stream at a location selected from locations upstream of the spray absorption chamber and locations within said chamber.

5. A process according to claim 1 or 4 wherein said particulate material and the powdery carbon as well as any fly ash are separated from the flue gas by means of an electrostatic precipitator.

6. A process according to claim 1 wherein the basic absorbent is selected from calcium hydroxide (slaked lime, hydrated lime), sodium carbonates and limestone.

7. A process according to claim 1 wherein a powdery activated carbon is used having a particle size permitting passage of at least 40% by weight thereof through a sieve having 44.micron apertures (by wet sieving) and which by microscopic examination is at average a few microns or less.

8. A process according to claim 1 for removal of mercury vapor and/or vapor of noxious organic compounds, wherein the powdery carbon is injected into the flue gas in an amount of 5–100 mg per $Nm^3$.

9. A process according to claim 1 wherein the gas is cooled at 100°–150° C. in the spray absorption step.

10. A process according to claim 1 for removal of nitrogen oxides, wherein the powdery carbon is injected into the flue gas in an amount of 100–500 mg per $Nm^3$.

* * * * *

REEXAMINATION CERTIFICATE (3987th)

United States Patent [19]
Moller et al.

[11] B1 4,889,698
[45] Certificate Issued Feb. 1, 2000

[54] PROCESS FOR REMOVAL OR MERCURY VAPOR AND/OR VAPOR OF NOXIOUS ORGANIC COMPOUNDS AND/OR NITROGEN OXIDES FROM FLUE GAS FROM AN INCINERATOR PLANT

[75] Inventors: Jens T. Moller, Allerod; Niels Jacobsen, Copenhagen; Kirsten K. Nielsen, Holte; Stig Rasmussen, Gadstrup, all of Denmark

[73] Assignee: A/S Niro Atomizer, Soborg, Denmark

Reexamination Request:
No. 90/005,167, Nov. 19, 1998

Reexamination Certificate for:
Patent No.: 4,889,698
Issued: Dec. 26, 1989
Appl. No.: 07/071,191
Filed: Jul. 8, 1987

[30] Foreign Application Priority Data

Jul. 16, 1986 [DK] Denmark .................................. 3381/86

[51] Int. Cl.⁷ .................................................. B01D 47/00
[52] U.S. Cl. ...................... 423/210; 423/235; 423/239.1; 423/245.1; 423/245.2
[58] Field of Search .................................. 423/210, 215.5, 423/235, 239.1, 240 S, 245.1, 243.08, 244.07, 244.01, 245.2; 95/235, 901

[56] References Cited

U.S. PATENT DOCUMENTS

| | | |
|---|---|---|
| 3,817,713 | 6/1974 | Ionescu . |
| 3,969,482 | 7/1976 | Teller . |
| 4,049,399 | 9/1977 | Teller . |
| 4,061,476 | 12/1977 | Holter et al. ................................ 55/77 |
| 4,113,840 | 9/1978 | Hanway, Jr. et al. . |
| 4,149,858 | 4/1979 | Noack et al. . |
| 4,246,242 | 1/1981 | Butler et al. ............................. 423/210 |
| 4,273,747 | 6/1981 | Rasmussen ............................... 423/210 |
| 4,293,524 | 10/1981 | Teller et al. . |
| 4,319,890 | 3/1982 | Teller et al. . |
| 4,369,167 | 1/1983 | Weir, Jr. . |
| 4,562,053 | 12/1985 | Andersson . |
| 4,583,999 | 4/1986 | Lindahl et al. . |
| 4,620,492 | 11/1986 | Vogg et al. . |
| 4,728,342 | 3/1988 | Abom . |

FOREIGN PATENT DOCUMENTS

| | | |
|---|---|---|
| 0 001 456 A1 | 4/1979 | European Pat. Off. . |
| 8630504 | 1/1987 | European Pat. Off. . |
| 0 253 563 B2 | 1/1988 | European Pat. Off. . |
| 2 122002 | 11/1971 | Germany . |
| 29 07 177 A1 | 9/1979 | Germany . |
| 29 32 429 A1 | 2/1981 | Germany . |
| 3334106 A1 | 5/1984 | Germany . |
| 27485 | of 1974 | Japan . |
| 136574 | of 1976 | Japan . |
| 31246 | of 1981 | Japan . |
| 468640 | 7/1972 | Russian Federation . |
| WO 85/03455 | 8/1985 | WIPO . |
| WO 87/01050 | 2/1987 | WIPO . |

OTHER PUBLICATIONS

Folder 1: Prosecution file history of Danish Patent No. 158376 B, Oct. 8, 1990.

Folder 2: Prosecution file history of European Patent No. 0253563, Jan. 24, 1990.

(List continued on next page.)

*Primary Examiner*—Tom Dunn

[57] ABSTRACT

The ability of activated carbon to remove mercury and noxious polyorganic matter, especially chlorodibenzo-dioxins and -furans from incinerator flue gases is utilized in an efficient manner by suspending powdery activated carbon in the flue gas in connection with a conventional spray absorption process in which the acidic components of the flue gas are neutralized by means of basic absorbents. The cooling of the flue gases in the spray absorption process provides an efficient adsorption onto the powdery activated carbon and the separation of said powdery activated carbon from the flue gas is substantially facilitated by the presence of the particulate material formed by the spray absorption process. Also an improved removal of nitrogen oxides is obtained.

OTHER PUBLICATIONS

"Trockene Sorption saurer, gasformiger, luftfremder Stoffe an staubformige Additive unterhalb 300 C", by Von Hans–Werner Hunich (1978).

"Zusammensetzung und Eigenschaften von Flugaschen", Von W. Richartz, Forschungsinstitul der Zementindustrie, Dusseldorf, Feb. 1984.

"Control of Dioxin Emissions from Incineration," A.J. Teller, Jun. 1983.

Zur Problematik der Quecksilber–Abscheidung aus Rauchgasen von Mullerbrennungsanlagen (English translation— "Removal of Mercury from Flue Gas from MSW Incineration Plants," by Dr. Hartmut Braun, Michael Metzger and Prof. Hubert Vogg, Mar. 27, 1998.

"Eigenuberwachung an Flugasche als Qualitatssicherungemaßnahme", Von H. Gulberfel (no date).

"The Removal of a Gaseous Constituent," Pergamon Press Inc., 1975.

"Industrial Carbon," Shreve's Chemical Process Industries, Fifth Edition, George T. Austin, 1984.

"Elnsatzmoglichkelten von Aktlv–Koks zur Rauchgasreinigung In Abfallbehandlungsanlagen," Prof. Dr.–Ing Karl J. Thome–Kozmiensky, Mullverbrennung und Umwelt, (1985).

"Allemenies" by Dr. Hartmut von Kienle, Dr. Erich Bader, 1980.

"Aktive Kohle Und Ihre Industrielle Verwendung" von Dr. G. Bailleul, Dr. K. Bratzler, Dr. W. Herbert, 1962.

Meyers Lexikon der Technik und der exalten Naturwissenschaften, Bibliographisches Institut,, p. 85 (no date).

Ullmanns Encyklopadie der technischen Chemie, Verfahrenstechnik I, p. 603 (no date).

Folder 4: Prosecution history of Norwegian patent application 872927, filed Jul. 14, 1987, issued as Norwegian Patent No. 168510 on Nov. 25, 1991.

Folder 5: Prosecution history of Canadian patent application No. 541,419, filed Jul. 7, 1987, which issued as Canadian patent No. 1,300,347 on May 12, 1992.

Folder No. 6: Prosecution history of Japanese Application No. 178159/1987, filed Jul. 16, 1987, which issued as Japanese Patent No. 029219 on Mar. 27, 1996.

"Acivated Carbon as Catalyst", H. Juntgen, Wissenschaft & Technik, Dec. 1986.

"Adsorption and Reaction Kinetics of NOx with Activated Carbon", P. G. Gray, N. J. Desai and D. D. Do, Recent Trends Chem. React. Eng. 2nd, 1987, p. 383–95.

Mitsui–BF Simultaneous SOx and NOx Removal System, Yoshio Ito, Fujimoto and O. Nagaoka, Year unknown, probably 1985.

"Acid Rain Prevention Thru New SOx/NOx Dry Scrubbing Process," Karsten Felsvang and Per Morsing, Eighth Symposium on "Flue Gas Desulfurization" Nov., 1983, New Orleans, Louisiana.

W. Strauss, "Industrial Gas Cleaning," Pergamon Press, Inc. (1975), pp. 135–139.

"Performance Response of Dry SO2 Removal System of Riverside Station," paper presented at the American Power Conference in Chicago, Illinois on Apr. 26–27, 1981 by Niro Atomizer, Inc.

"Technique of Waste Disposal," Kogyo Cosaki Publishing Co., Ltd. (1972).

B1 4,889,698

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 is confirmed.

New claims 11–31 are added and determined to be patentable.

11. *A process for removal of mercury vapor from a stream of hot flue gas exhausted from an incinerator plant and containing fly ash, combined with a simultaneous removal of acidic components of the flue gas, by passing said stream at a temperature of 135°–400° C. into a spray absorption chamber wherein an aqueous liquid containing a basic absorbent is atomized to cool the flue gas at a temperature between 180° C. and 90° C. and to absorb acidic components from the flue gas, and simultaneously to evaporate the water in said aqueous liquid, thereby forming a particulate material containing reaction products of the basic absorbent with acidic components of the flue gas, and nonreacted absorbent, which particulate material together with the fly ash is separated from the flue gas in a particle separator downstream of the spray absorption chamber, comprising injecting powdery activated carbon in an amount of 1–800 mg per $Nm^3$ flue gas into the stream of flue gas at least one location upstream of the spray absorption chamber, and separating said powdery carbon in the particle separator together with said particulate material.*

12. *A process according to claim 11 wherein the particulate material and the powdery carbon as well as the fly ash are separated from the flue gas by a bag filter.*

13. *A process according to claim 11 wherein the particulate material and the powdery carbon as well as the fly ash are separated from the flue gas by electrostatic precipitation.*

14. *A process according to claim 11 wherein a powdery activated carbon is used having a particle size permitting passage of at least 40% by weight thereof through a sieve having 44 micron apertures (by wet sieving) and which by microscopic examination is at average a few microns or less.*

15. *The process according to claim 14 wherein the particulate material and the powdery carbon as well as the fly ash are separated from the flue gas by a bag filter.*

16. *The process according to claim 14 wherein the particulate material and the powdery carbon as well as the fly ash are separated from the flue gas by electrostatic precipitation.*

17. *A process according to claim 11 for removal of mercury vapor wherein the powdery carbon is injected into the flue gas in an amount of 5–100 mg per $Nm^3$.*

18. *A process for removal of mercury vapor from a stream of hot flue gas exhausted from an incinerator plant and containing fly ash, combined with a simultaneous removal of acidic components of the flue gas, by passing said stream at a temperature of 135°–400° C. into a spray absorption chamber wherein an aqueous liquid containing a basic absorbent is atomized to cool the flue gas at a temperature between 180° C. and 90° C. and to absorb acidic components from the flue gas, and simultaneously to evaporate the water in said aqueous liquid, thereby forming a particulate material containing reaction products of the basic absorbent with acidic components of the flue gas, and nonreacted absorbent, which particulate material together with the fly ash is separated from the flue gas in a particle separator downstream of the spray absorption chamber, comprising injecting powdery activated carbon in an amount of 1–800 mg per $Nm^3$ flue gas into the stream of flue gas at least one location within the spray absorption chamber, and separating said powdery carbon in the particle separator together with said particulate material.*

19. *A process according to claim 18 wherein the particulate material and the powdery carbon as well as the fly ash are separated from the flue gas by a bag filter.*

20. *A process according to claim 18 wherein the particulate material and the powdery carbon as well as the fly ash are separated from the flue gas electrostatic precipitation.*

21. *A process according to claim 18 wherein a powdery activated carbon is used having a particle size permitting passage of at least 40% by weight thereof through a sieve having 44 micron apertures (by wet seiving) and which by microscopic examination is at average a few microns or less.*

22. *The process according to claim 21 wherein the particulate material and the powdery carbon as well as the fly ash are separated from the flue gas by a bag filter.*

23. *The process according to claim 21 wherein the particulate material and the powdery carbon as well as the fly ash are separated from the flue gas by electrostatic precipitation.*

24. *A process according to claim 18 for removal of mercury vapor wherein the powdery carbon is injected into the flue gas in an amount of 5–100 mg per $Nm^3$.*

25. *A process for removal of mercury vapor from a stream of hot flue gas exhausted from an incinerator plant and containing fly ash, combined with a simultaneous removal of acidic components of the flue gas, by passing said stream at a temperature of 135°–400° C. into a spray absorption chamber wherein an aqueous liquid containing a basic absorbent is atomized to cool the flue gas at a temperature between 180° C. and 90° C. and to absorb acidic components from the flue gas, and simultaneously to evaporate the water in said aqueous liquid, thereby forming a particulate material containing reaction products of the basic absorbent with acidic components of the flue gas, and nonreacted absorbent, which particulate material together with the fly ash is separated from the flue gas in a particle separator downstream of the spray absorption chamber, comprising injecting powdery activated carbon in an amount of 1–800 mg $Nm^3$ flue gas into the stream of flue gas at least one location downstream of the spray absorption chamber but upstream of the particle separator, and separating said powdery carbon in the particle separator together with said particulate material.*

26. *A process according to claim 25 wherein the particulate material and the powdery carbon as well as the fly ash are separated from the flue gas by a bag filter.*

27. *A process according to claim 25 wherein the particulate material and the powdery carbon as well as the fly ash are separated from the flue gas by an electrostatic precipitator.*

28. *A process according to claim 25 wherein a powdery activated carbon is used having a particle size permitting passage of at least 40% by weight thereof through a sieve having 44 micron apertures (by wet sieving) and which by microscopic examination is at average a few microns or less.*

29. The process according to claim 28 wherein the particulate material and the powdery carbon as well as the fly ash are separated from the flue gas by a bag filter.

30. The process according to claim 28 wherein the particulate material and the powdery carbon as well as the fly ash are separated from the flue gas by electrostatic precipitation.

31. A process according to claim 29 for removal of mercury vapor wherein the powdery carbon is injected into the flue gas in an amount of 5–100 mg per $Nm^3$.

* * * * *